(12) United States Patent
Coffin et al.

(10) Patent No.: US 7,775,025 B1
(45) Date of Patent: Aug. 17, 2010

(54) HEIGHT ADJUSTER FOR GRASS GROOMING REEL

(75) Inventors: Scott M. Coffin, Plymouth, MN (US); Gregory M. Kostik, Minneapolis, MN (US)

(73) Assignee: The Toro Company, Bloomington, MN (US)

(*) Notice: Subject to any disclaimer, the term of this patent is extended or adjusted under 35 U.S.C. 154(b) by 838 days.

(21) Appl. No.: 11/262,231

(22) Filed: Oct. 28, 2005

(51) Int. Cl.
  *A01D 34/53* (2006.01)
(52) U.S. Cl. .......................................... 56/249; 56/294
(58) Field of Classification Search ................. 56/249, 56/294, 254, 253, 256, 17.1, 17.2, 10.4
  See application file for complete search history.

(56) References Cited

U.S. PATENT DOCUMENTS

| | | | | |
|---|---|---|---|---|
| 1,872,119 A | * | 8/1932 | Carlson | 56/294 |
| 2,204,255 A | * | 6/1940 | Moyer | 56/294 |
| 2,253,924 A | * | 8/1941 | Worthington | 56/253 |
| 2,513,311 A | * | 7/1950 | Grobowski | 56/254 |
| 2,583,543 A | * | 1/1952 | Boyce et al. | 56/254 |
| 2,869,309 A | * | 1/1959 | Benson | 56/249 |
| 2,896,390 A | * | 7/1959 | Cunningham | 56/249 |
| 2,968,906 A | * | 1/1961 | Grimes | 56/249 |
| 3,178,874 A | * | 4/1965 | Hanson et al. | 56/254 |
| 3,217,479 A | * | 11/1965 | Robinson et al. | 56/254 |
| 3,423,919 A | * | 1/1969 | Cook | 56/249 |
| 3,576,097 A | * | 4/1971 | Speiser | 56/249 |
| 3,628,318 A | * | 12/1971 | Grobowski | 56/249 |
| 3,680,293 A | * | 8/1972 | Klemenhagen | 56/254 |
| 3,918,239 A | * | 11/1975 | Aldred et al. | 56/7 |
| 4,021,996 A | * | 5/1977 | Bartlett et al. | 56/7 |
| 4,335,569 A | * | 6/1982 | Keeney et al. | 56/249 |
| 4,481,757 A | * | 11/1984 | Tsuchiya | 56/16.9 |
| 4,494,365 A | | 1/1985 | Lloyd | |
| 4,606,178 A | * | 8/1986 | Saiia | 56/249 |
| 4,637,204 A | * | 1/1987 | Benson et al. | 56/249 |
| 4,644,737 A | * | 2/1987 | Arnold | 56/249 |
| 4,841,717 A | * | 6/1989 | Lloyd | 56/256 |
| 4,878,340 A | | 11/1989 | Roy et al. | |
| 5,203,151 A | * | 4/1993 | Mills | 56/17.2 |
| 5,241,810 A | * | 9/1993 | Reichen | 56/249 |
| 5,291,724 A | * | 3/1994 | Cotton | 56/251 |
| 5,477,666 A | * | 12/1995 | Cotton | 56/251 |
| 5,511,365 A | * | 4/1996 | Rice | 56/7 |
| 5,553,380 A | * | 9/1996 | Rice | 29/895.2 |
| 5,950,409 A | * | 9/1999 | Davies | 56/249 |

(Continued)

FOREIGN PATENT DOCUMENTS

GB  276286  8/1927

*Primary Examiner*—Árpád Fábián-Kovács
(74) *Attorney, Agent, or Firm*—James W. Miller

(57) ABSTRACT

A height adjuster for a grass grooming reel used on a mower includes a rod secured to the bellcrank support(s) which carry the grooming reel. A driver used for a fine adjustment has a screw thread connection to the top of the rod. The driver sits atop a rotary knob having a cam connection to the frame of the mower. The knob effects a quick up/quick down adjustment of the grooming reel between a raised transport position and a lowered grooming position. The knob includes a pointer or finger that points upwardly away from the ground when the grooming reel is in its raised transport position and points downwardly towards the ground when the grooming reel is in its lowered grooming position.

11 Claims, 3 Drawing Sheets

U.S. PATENT DOCUMENTS

| | | | |
|---|---|---|---|
| 6,044,637 A * | 4/2000 | Thier et al. | 56/249 |
| 6,082,086 A * | 7/2000 | Togoshi et al. | 56/199 |
| 6,318,059 B1 * | 11/2001 | Cotton | 56/251 |
| 6,622,464 B2 * | 9/2003 | Goman et al. | 56/16.9 |
| 6,732,500 B1 * | 5/2004 | Myers | 56/17.2 |
| 7,114,318 B2 * | 10/2006 | Poulson et al. | 56/249 |
| 7,121,073 B2 * | 10/2006 | Schmidt et al. | 56/249 |
| 7,231,757 B2 * | 6/2007 | Poulson et al. | 56/249 |
| 7,377,092 B2 * | 5/2008 | Schmidt et al. | 56/249 |
| 2003/0140611 A1 * | 7/2003 | Burke | 56/17.2 |

* cited by examiner

HEIGHT ADJUSTER FOR GRASS GROOMING REEL

TECHNICAL FIELD

This invention relates generally to a grass grooming reel used on a mower. More particularly, this invention relates to a height adjuster for changing the height of the grooming reel relative to the ground.

BACKGROUND OF THE INVENTION

Grass grooming reels are often used on reel mowers to facilitate and encourage the growth of healthy grass. Such grooming reels comprise a transversely extending reel shaft that rotates about a horizontal axis. The reel shaft has a plurality of laterally spaced, toothed blades spaced along the length thereof. The blades form one or more flights of blade tips that wind helically around the length of the shaft. As the grooming reel is rotated, the blade tips remove thatch and cut horizontal grass growth in advance of the grass cutting action provided by the cutting reel and bedknife of the reel mower. U.S. Pat. No. 4,494,365 to Lloyd discloses such a grass grooming reel.

U.S. Pat. No. 4,878,340 to Roy et al., which is owned by The Toro Company, the assignee of this invention, discloses a height adjuster for changing the height of the grooming reel relative to the ground. This height adjuster provides two distinct types of height adjustment. The first is a fine adjustment in which the height of the grooming reel is adjusted in relatively small, discrete increments to fine tune the position of the grooming reel relative to the ground. The second is a quick up/quick down adjustment to allow the user to move the grooming reel from a lowered grooming position closely adjacent the ground to a raised transport position considerably spaced above the ground. The quick up/quick down adjustment can be used without changing the setting provided by the fine adjustment.

While the height adjuster shown in the 340 patent works very well, it is not as intuitively obvious to use as one might wish. The top of the height adjuster comprises a large, rotary knob that the user grips and turns by hand to effect the fine adjustment of the grooming reel. However, to make the fine adjustment, the user must first lift the knob to disengage detents formed along a lower edge of the knob from a lock pin extending out beneath the knob. Unless the user is familiar with the operation of this height adjuster and/or has the user's manual immediately available, the need to first raise the knob to disengage the knob from the lock pin is not apparent. Thus, some users may not be able to immediately figure out how to make the fine adjustment.

In addition, the detents formed along the lower edge of the knob are not visible to a user standing above the knob and looking substantially straight down at the knob. Many users naturally rotate the knob by reaching down to grip and turn the knob from immediately above the knob. These users would not be able to simultaneously see the detents and the lock pin to be able to judge how far to rotate the knob unless they were also to bend over and get close enough to view the lower edge of the knob. This is inconvenient.

Instead of visually observing the detents and the lock pin, such users could leave the detents and lock pin partially engaged in an attempt to count the clicks. However, this runs counter to the user's natural tendency to pull up on the knob to its full extent to completely disengage the detents from the lock pin. In addition, even if one attempts to partially disengage the detents and the lock pin by only partially elevating the knob, it is difficult to find and maintain an elevated position of the knob where one can hear the clicks but the knob is still relatively easy to turn.

Moreover, the lock pin forms double duty as the handle that must be turned by the user to effect the quick up/quick down adjustment. The lock pin rides up a cam ramp to lift the rotary knob to perform the quick up phase of the adjustment and rides down the cam ramp to perform the quick down phase of the adjustment. Again, it is not immediately obvious to the user that this lock pin is what one uses to perform the quick up/quick down adjustment. In addition, even if the user understands the purpose of the lock pin, if the user attempts to leave the detents in the knob partially engaged with the lock pin to count clicks when making a fine adjustment, this partial engagement may be enough to also rotate the lock pin to begin a quick up/quick down adjustment. This is an undesirable aspect since the rotary knob plays a part in both the fine adjustment and the quick up/quick down adjustment.

Finally, the height adjuster of the 340 patent has no indicator to tell the user whether the grooming reel is in its lowered grooming position or its raised transport position. The lock pin to some extent forms such an indicator as it projects out to one side of the knob. However, when the grooming reel is in its lowered grooming position, the lock pin points upwardly and rearwardly away from the ground. When the grooming reel is in its raised transport position, the lock pin points forwardly and downwardly towards the ground.

Thus, to the extent the lock pin forms an indicator, it indicates the reverse of what a user would naturally expect from the indicator. When the lock pin is pointing upwardly away from the ground, the user would naturally think this indicates that the grooming reel is in its raised transport position. But, actually the grooming reel is in its lowered grooming position when the lock pin points upwardly. Similarly, when the lock pin points downwardly towards the ground, the grooming reel is in its raised transport position, the opposite of what the user would expect. Thus, the orientation of the lock pin in its two positions is confusing to the user since it actually indicates the reverse of the actual position of the grooming reel.

Accordingly, it would be an advance in the art to provide a height adjuster for a grass grooming reel that is more intuitively obvious to use and that includes an indicator that points up when the grooming reel is in its raised transport position and that points down when the grooming reel is in its lowered grooming position.

SUMMARY OF THE INVENTION

One aspect of this invention relates to an improved grass grooming reel carried on a frame of the mower by at least one support. The improvement relates to at least one height adjuster for changing the height of the grooming reel relative to the ground. The height adjuster comprises a rod connected to the support that carries the grooming reel. A driver has a screw thread connection to the rod for making a fine adjustment of the grooming reel relative to the ground when the driver is rotated. A rotary knob is provided that is large enough to be gripped and turned by hand. The rotary knob a cam connection to the mower frame for effecting a quick up/quick down adjustment of the grooming reel relative to the ground when the rotary knob is rotated by hand between first and second positions of the rotary knob. The driver is rotatable independently of the rotary knob such that the fine adjustment can be made by rotating the driver without rotating the rotary knob.

Another aspect of this invention relates to an improved grass grooming reel carried on a frame of the mower by at least one support. The improvement relates to at least one height adjuster for changing the height of the grooming reel relative to the ground. The height adjuster comprises a rod connected to the support that carries the grooming reel. A rotary knob is provided that is large enough to be gripped and turned by hand. The rotary knob effects a quick up/quick down adjustment of the grooming reel between a raised transport position and a lowered grooming position when the rotary knob is rotated by hand between first and second positions of the rotary knob. A pointer or finger is carried on the rotary knob. The pointer or finger points upwardly away from the ground when the grooming reel is in its raised transport position and points downwardly towards the ground when the grooming reel is in its lowered grooming position.

One more aspect of this invention relates to an improved grass grooming reel carried on a frame of the mower by at least one support. The improvement relates to at least one height adjuster for changing the height of the grooming reel relative to the ground. The height adjuster comprises a rod connected to the support that carries the grooming reel. A threaded driver is provided for making a fine adjustment of the grooming reel relative to the ground when the driver is rotated. A rotary knob that is large enough to be gripped and turned by hand is provided for effecting a quick up/quick down adjustment of the grooming reel relative to the ground. The driver has a top with a tool mating configuration to allow the driver to be turned by a tool applied to the top of the driver. The driver sits atop the rotary knob to be visible and easily accessible from above the rotary knob.

BRIEF DESCRIPTION OF THE DRAWINGS

This invention will be described hereafter in the Detailed Description, taken in conjunction with the following drawings, in which like reference numerals refer to like elements or parts throughout.

FIG. 4 is a top plan view of the height adjuster shown in FIG. 1, particularly illustrating in solid lines the orientation of the rotary knob when the grooming reel in its raised transport position and in phantom lines the orientation of the rotary knob when the grooming reel in its lowered grooming position.

DETAILED DESCRIPTION

Figure 1:
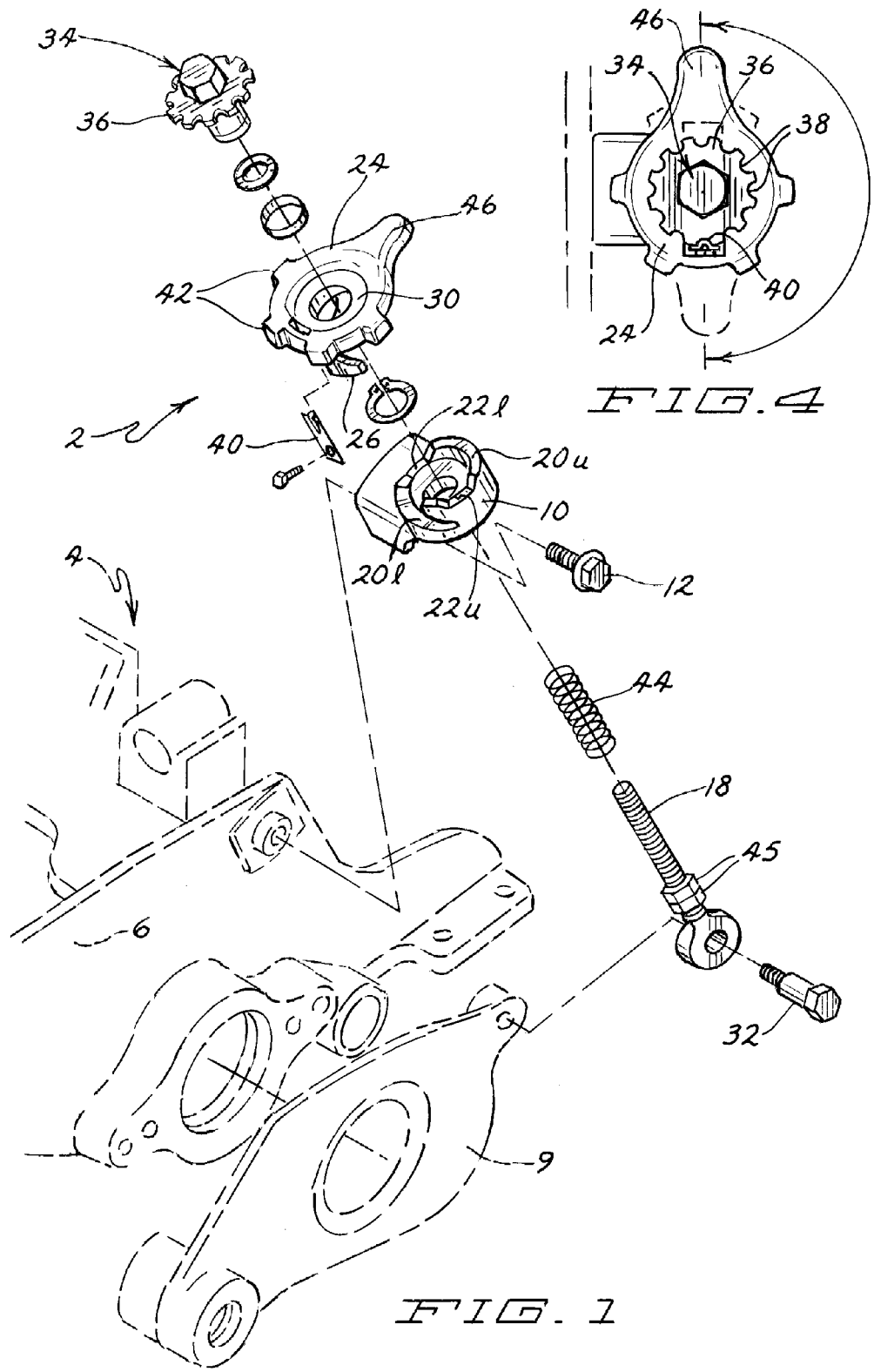
FIG. 1 is an exploded perspective view of a height adjuster according to this invention used for adjusting a grass grooming reel.

One embodiment of a height adjuster according to this invention is illustrated as 2 in FIGS. 1-4. Height adjuster 2 is used on a reel mower 4 of conventional design having a mower frame 6 supported for rolling over the ground by one or more ground engaging members, such as front and rear rollers. A powered, rotatable grass grooming reel 8 is located on mower frame 6 between the front roller and the cutting reel/bedknife grass cutting mechanism. Grooming reels 8 and reel mowers 4 of this type are disclosed in U.S. Pat. No. 4,494,365 to Lloyd and U.S. Pat. No. 4,878,340 to Roy et al., both of which are incorporated by reference herein.

A pivotal support 9 carries grooming reel 8 on a front arm thereof in advance of the pivot axis of support 9. Height adjuster 2 of this invention is connected between mower frame 6 and a rear arm of support 9. When height adjuster 2 pushes down on the rear arm of support 9, grooming reel 8 rises relative to the ground. When height adjuster 2 pulls up on the rear arm of support 9, grooming reel 8 lowers relative to the ground.

There are a pair of spaced supports 9 with each support 9 being located on one side of mower frame 6 to support opposite ends of grooming reel 8. Consequently, there are a pair of height adjusters 2 with each height adjuster 2 being located on one side of mower frame 6 and being connected to one support 9. However, height adjusters 2 are identical to one another and so only a single height adjuster 2 will be shown and described herein.

Height adjuster 2 includes a hollow cylindrical hub 10 that is secured by a bolt 12 to a sidewall of mower frame 6. Hub 10 is closed at the bottom by a bottom wall 14. Bottom wall 14 has a hole 16 for allowing an elongated connecting rod 18 to pass through hub 10.

The top edge of hub 10 is contoured to have a lower, upwardly inclined cam ramp $20_l$ followed by a lower detent $22_l$ at the top of lower cam ramp $20_l$. Lower cam ramp $20_l$ and lower detent $22_l$ extend 180° around the circumference of hub 10. A similarly shaped upper cam ramp $20_u$ and upper detent $22_u$ then extend around another 180° of the circumference of hub 10. The cam ramps 20 and detents 22 are part of a quick up/quick down adjustment for grooming reel 8, as will be explained in more detail hereafter.

Figure 3:
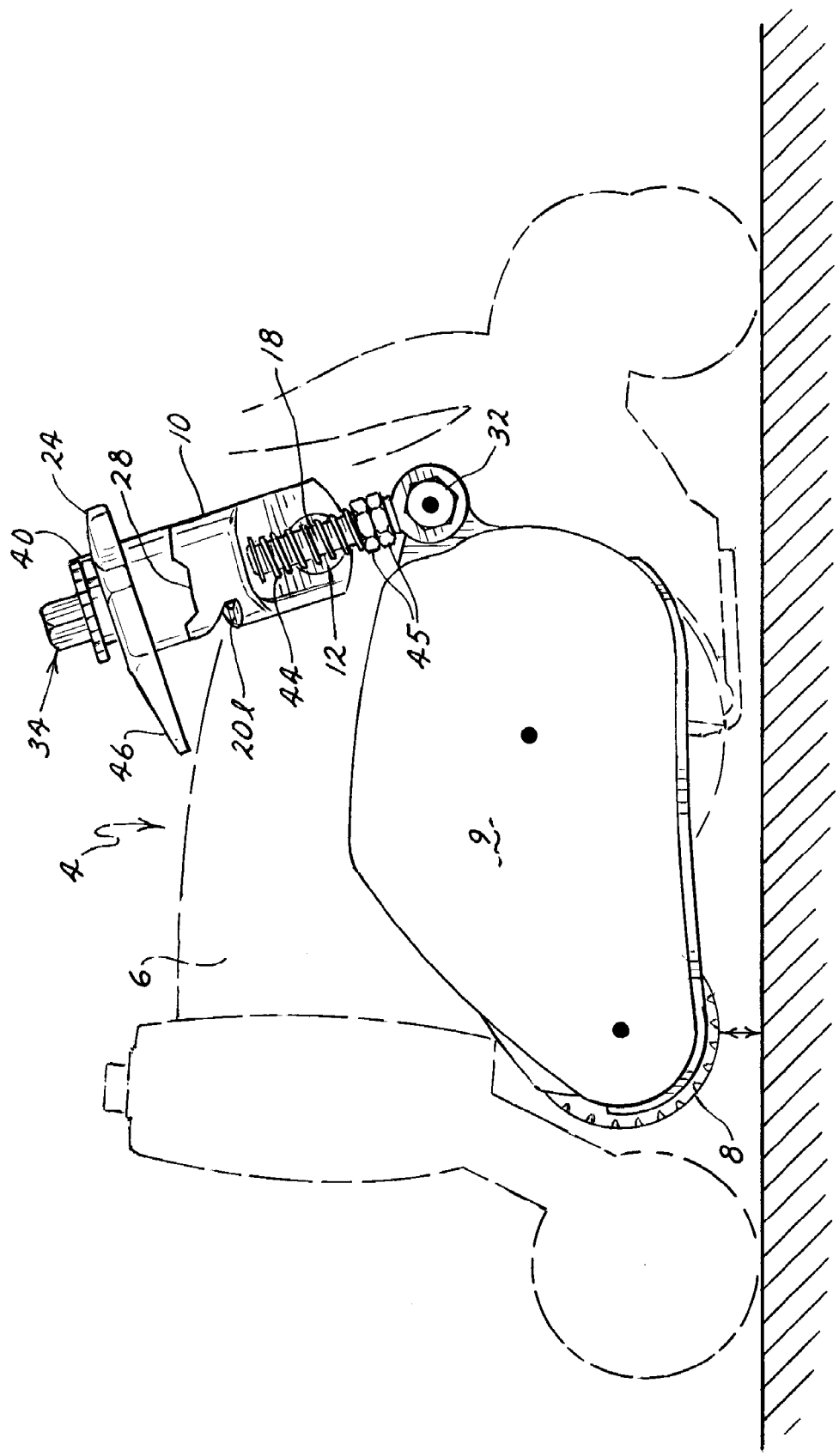
FIG. 3 is a side elevational view of the height adjuster shown in FIG. 1, particularly illustrating the grooming reel in its lowered grooming position.

A rotary knob 24 large enough to be turned and gripped by hand sits atop hub 10. The underside of knob 24 includes a cam 26 and a lock tab 28 that are shaped to mate with one of the cam ramps 20 and the detent 22 that follows that cam ramp 20. When cam 26 and lock tab 28 are in face to face mating engagement with lower cam ramp $20_l$ and lower detent$_l$ as shown in FIG. 4, knob 24 is lowered relative to hub 10. Conversely, when knob 24 is turned through 180° while sitting atop hub 10 and cam 26 and lock tab 28 move from lower cam ramp $20_l$ and lower detent$_l$ to upper cam ramp $20_u$ and upper detent $22_u$, knob 24 is raised relative to hub 10 as shown in FIG. 3.

Knob 24 has a central hole 30 to allow rod 18 to pass through knob 24, just as hole 16 in bottom wall 14 of hub 10 allowed rod 18 to pass through hub 10. The bottom of rod 18 is connected to the rear arm of support 9 by a connecting bolt 32. Thus, up and down movement of rod 18 will pull up or push down on the rear arm of support 9 in either a fine adjustment or a quick up/quick down adjustment of grooming reel 8.

A driver 34 located above knob 24 has a screw thread connection to a top of threaded rod 18. Driver 34 forms an enlarged head on rod 18 and rests on top of knob 24. Thus, driver 34 does not move vertically up and down relative to knob 24 if driver 34 is rotated in one direction or the other. Instead, the rotation of driver 34 pulls rod 18 further up into driver 34 if driver 34 is rotated in one direction, or extends rod 18 downwardly out of driver 34 if driver 34 is rotated in an opposite direction.

Driver 34 is how the fine adjustment of grooming reel 8 is made. For example, rotating driver 34 by 180° will move rod 18 up or down by only one/half of the pitch of the screw thread. If the pitch of the screw thread is a quarter inch, then rotating driver 34 a half turn will move the rod by only an eighth inch. Thus, the fine adjustment provided by driver 34 allows small and precise adjustments of grooming reel 8 to be made. Such a fine adjustment is usually made when grooming reel 8 is in its lowered grooming position to fine tune the position of grooming reel 8 relative to the ground.

Driver 34 includes an annular detent flange 36 having a plurality of detents 38 provided around the circumference thereof. Detents 38 cooperate with an upwardly extending, flexible locking finger 40 provided on knob 24. The interaction between locking finger 40 and any one of detents 38 holds knob 24 in an adjusted position after a fine adjustment is made. Since there are many detents 38 around the circumference of detent flange 36, the minimum amount of movement of rod 18 in a fine adjustment is very small, namely the pitch thread multiplied by the number of degrees between adjacent detents 38 divided by 360. When driver 34 is purposely turned by the user, locking finger 40 is cammed back out of one detent 38 to allow detent flange 36 to pass by and then snaps back into the next adjacent detent 38, repeating as needed until the desired amount of fine adjustment has been made.

The top of driver 34 has a configuration, such as a hex head 40, that permits a compatible tool, such as a socket wrench, to be applied to driver 34 to make the fine adjustment described above. The tool receiving configuration and tool could obviously be varied. For example, an appropriately shaped hole could be placed in the top of driver 34 for receiving an Allen wrench. Alternatively, the top of driver 34 could also be a second knob that is gripped and turned by hand, though this is not preferred. A second knob large enough to be turned by hand would be too close to and potentially interfere with knob 24 that is used to make the quick up/quick down adjustment.

Figure 2:
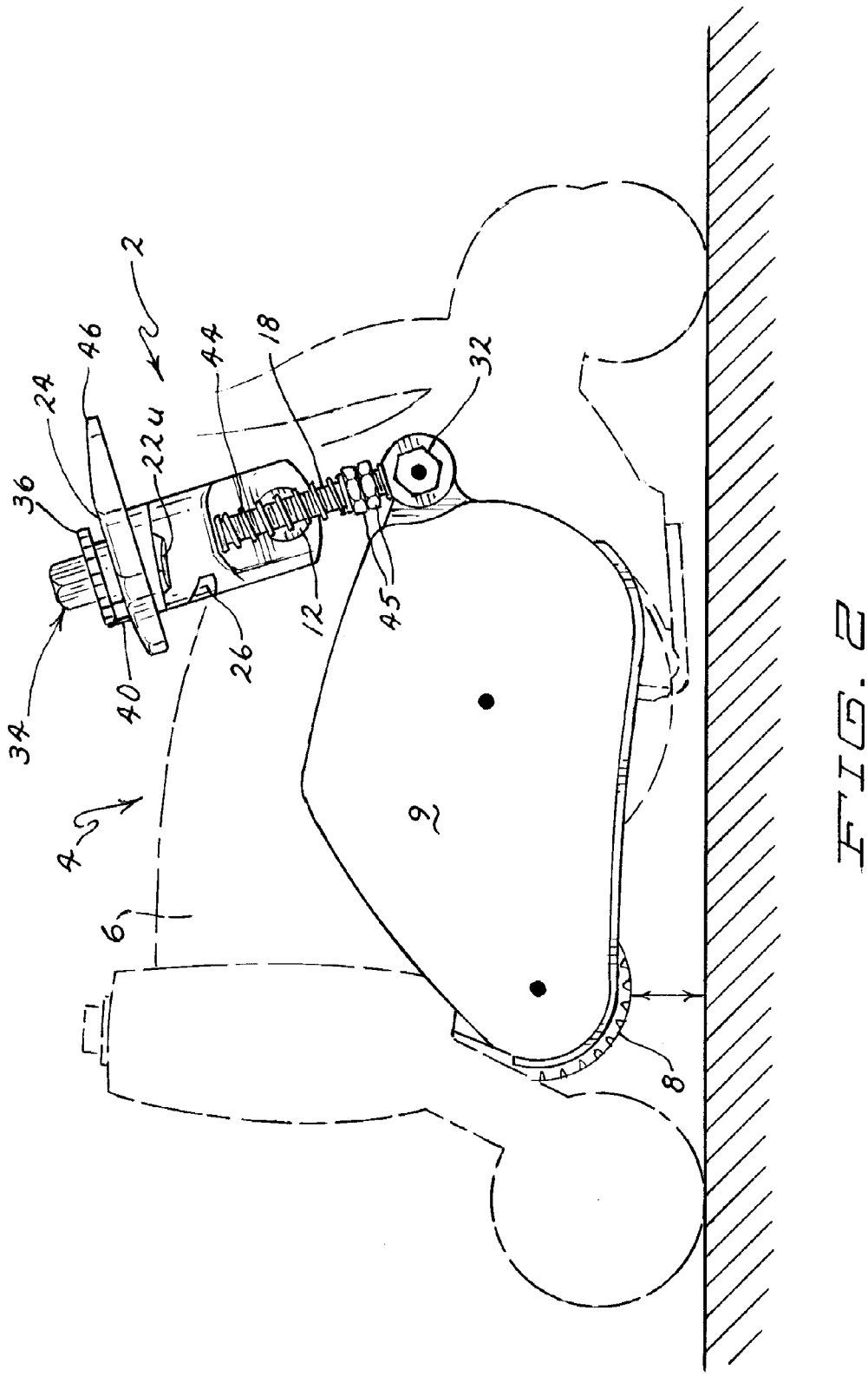
FIG. 2 is a side elevational view of the height adjuster shown in FIG. 1, particularly illustrating the grooming reel in its raised transport position.

Knob 24 is turned through 180° in one direction or the other to make the quick up/quick down adjustment. Knob 24 can have peripheral teeth 42 to allow the user to better grip and turn knob 24. Referring now to FIG. 2, when cam 26 and lock tab 28 are in engagement with lower cam ramp $20_l$ and lower detent $22_l$, knob 24 sits lower on hub 10 and grooming reel 8 is in its raised transport position. If knob 24 is now rotated through 180° from the solid to the phantom line position shown in FIG. 4, cam 26 and lock tab 28 on the underside of knob 24 move from engagement with lower cam ramp $20_l$ and lower detent $22_l$ to engagement with upper cam ramp $20_u$ and upper detent $22_u$. Knob 24 rises in height on hub 10 thus forcing driver 34 on rod 18 and rod 18 itself bodily upward. This pivots grooming reel 8 downwardly to move from its raised transport position to its lowered grooming position. Rotation of knob 24 by 180° back in the opposite direction has the opposite result, namely grooming reel 8 is restored to its raised transport position.

A spring 44 is used between a pair of jam nuts 45 on the bottom of rod 18 and the underside of bottom wall 14 of hub 10. Jam nuts 45 can be moved up and down on rod 18 to adjust the compression of spring 44 to a suitable level depending upon the fine adjustment provided by the rotation of driver 34. Spring 44 performs two functions. It keeps driver 34 on the top of rod 18 pressed against the top of knob 24. In addition, when grooming reel 8 is in its lowered grooming position as shown in FIG. 3, spring 44 is further compressed, thus storing energy. This stored energy is used to help counterbalance the weight of grooming reel 8 when moving grooming reel 8 to its raised transport position. This lessens the force required to turn knob 24.

Obviously, rotation of knob 24 through 180° will move grooming reel 8 the full way between its lowered grooming position and its raised transport position, which may be as much as a half inch or so. Rotation of driver 34 through 180° only effects movement by a small fraction of an inch. In addition, motion of knob 24 does not in any way affect or change the fine adjustment provided by driver 34. Driver 34, its annular detent flange 36, and flexible locking finger 40 all simply rotate around with knob 24, but stay stationary relative to one another.

Knob 24 also includes a radially extending pointer or finger 46 that projects from one side of the circumference of knob 24. Finger 46 visually indicates to the user the position of grooming reel 8 following a quick up/quick down adjustment. When grooming reel 8 is in its raised transport position as shown in FIG. 2, finger 46 points upwardly and away from the ground. Conversely, when grooming reel 8 is in its lowered grooming position as shown in FIG. 3, finger 46 points downwardly and towards the ground. Thus, finger 46 is logically and directly linked to the position of grooming reel 8, pointing up when grooming reel 8 is in its raised position and pointing down when grooming reel 8 is in its lowered position. The user can tell at a glance the position of grooming reel 8 by observing finger 46.

In addition, height adjuster 2 of this invention is more intuitive and easy to use in several different ways. First, driver 34 is above knob 24 and is always visible and accessible to a user who is standing above height adjuster 2 and looking down. In addition, the annular detent flange 36 and locking finger 40 are also visible. Moreover, the use of a driver 34 shaped to receive a tool, such as a socket wrench, is similar to many other fine adjusters used on mowers, i.e. to adjusters used for moving the front and rear rollers of mower 4 up and down. Thus, it would be immediately apparent to a user that driver 34 is separate from knob 24 and is meant to provide a fine adjustment in the position of grooming reel 8.

Second, the user would also inherently understand that knob 24 is to be gripped and turned by hand to make the quick up/quick down adjustment. There is no separate pin that has to be used to rotate knob 24 in an indirect fashion. All the user must do is grab knob 24 and give it a turn and it will move. The presence of finger 46 reinforces this understanding. Accordingly, height adjuster 2 of this invention is substantially easier to understand and use than those in the prior art.

Various modifications other than those described above will be apparent to those in the art. Thus, this invention will be limited only by the appended claims.

We claim:

1. An improved grass grooming reel carried on a frame of the mower by at least one support, wherein the improvement relates to at least one height adjuster for changing the height of the grooming reel relative to the ground, which comprises:
   (a) a rod connected to the support that carries the grooming reel;
   (b) a driver having a screw thread connection to the rod for making a fine adjustment of the grooming reel relative to the ground when the driver is rotated;
   (c) a rotary knob that is large enough to be gripped and turned by hand, the rotary knob having a cam connection to the mower frame for effecting a quick up/quick down adjustment of the grooming reel relative to the ground when the rotary knob is rotated by hand between first and second positions of the rotary knob;
   (d) wherein the driver is rotatable independently of the rotary knob such that the fine adjustment can be made by rotating the driver without rotating the rotary knob, and wherein the driver sits atop the rotary knob to be visible and easily accessible from above the rotary knob; and
   (e) a set of detents on the driver cooperable with a lock on the rotary knob for holding the driver in an adjusted position relative to the rotary knob.

2. The grass grooming reel of claim 1, wherein the driver has a top with a tool mating configuration to allow the driver to be turned by a tool applied to the top of the driver.

3. The grass grooming reel of claim 2, wherein the top of the driver has a hex head configuration to allow the driver to be turned by a wrench.

4. The grass grooming reel of claim 1, wherein the set of detents comprises an annular detent flange on the driver positioned beneath the top of the driver, the annular detent flange having a plurality of detents spaced around a circumference thereof.

5. The grass grooming reel of claim 4, wherein the lock on the rotary knob comprises a flexible locking finger engaged with one of the detents carried around the circumference of the locking flange, the finger being biased radially inwardly towards the annular flange to engage the finger with the detents carried on the annular flange but allowing the finger to flex radially outwardly when the driver is rotated to allow the annular flange to rotate past the locking finger.

6. The grass grooming reel of claim 1, wherein the grooming reel is disposed in a raised transport position when the rotary knob is in the first position and in a lowered grooming position when the rotary knob is in the second position.

7. The grass grooming reel of claim 6, wherein the first and second positions of the rotary knob are reached by rotating the rotary knob 180°.

8. The grass grooming reel of claim 6, wherein the rotary knob has an indicator to visually allow a user to look at the indicator to determine if the grooming reel is in the raised transport position or the lowered grooming position.

9. The grass grooming reel of claim 8, wherein the indicator comprises a pointer or finger carried on the rotary knob, the pointer or finger pointing upwardly away from the ground when the grooming reel is in its raised transport position and pointing downwardly towards the ground when the grooming reel is in its lowered grooming position.

10. An improved grass grooming reel carried on a frame of the mower by at least one support, wherein the improvement relates to at least one height adjuster for changing the height of the grooming reel relative to the ground, which comprises:
   (a) a rod connected to the support that carries the grooming reel, wherein the rod has an axis;
   (b) a rotary knob that is large enough to be gripped and turned by hand, the rotary knob effecting a quick up/quick down adjustment of the grooming reel between a raised transport position and a lowered grooming position when the rotary knob is rotated by hand between first and second positions of the rotary knob;
   (c) a pointer or finger carried on the rotary knob, the pointer or finger pointing upwardly away from the ground when the grooming reel is in its raised transport position and pointing downwardly towards the ground when the grooming reel is in its lowered grooming position;
   (d) a rotatable threaded driver connected to the rod for effecting a fine adjustment of the grooming reel relative to the ground when the grooming reel is in the lowered grooming position; and
   (e) wherein both the knob and the threaded driver rotate about the axis of the rod.

11. The grass grooming reel of claim 10, wherein the threaded driver sits on top of the knob.

* * * * *

UNITED STATES PATENT AND TRADEMARK OFFICE
CERTIFICATE OF CORRECTION

PATENT NO. : 7,775,025 B1  Page 1 of 1
APPLICATION NO. : 11/262231
DATED : August 17, 2010
INVENTOR(S) : Scott M. Coffin et al.

It is certified that error appears in the above-identified patent and that said Letters Patent is hereby corrected as shown below:

Col. 6, Line 43, change "the mower" to --a mower--; and
Col. 8, Line 5, change "the mower" to --a mower--.

Signed and Sealed this

Ninth Day of November, 2010

David J. Kappos
*Director of the United States Patent and Trademark Office*